United States Patent
Ohlsson et al.

[11] Patent Number: 6,106,757
[45] Date of Patent: Aug. 22, 2000

[54] BEVERAGE CAN LID AND METHOD OF MAKING

[75] Inventors: Per Ohlsson, Surrey, United Kingdom; Elmar Mock, Biel, Switzerland

[73] Assignee: Tetra Laval Holdings & Finance S.A., Pully, Switzerland

[21] Appl. No.: 09/355,009

[22] PCT Filed: Jan. 31, 1997

[86] PCT No.: PCT/US97/01789

§ 371 Date: Oct. 20, 1999

§ 102(e) Date: Oct. 20, 1999

[87] PCT Pub. No.: WO98/33720

PCT Pub. Date: Aug. 6, 1998

[51] Int. Cl.[7] .................................................. B28B 1/24
[52] U.S. Cl. ..................... 264/251; 264/259; 264/296; 264/322; 53/487; 413/5; 220/254; 220/270
[58] Field of Search ................................. 220/258, 256, 220/254, 265, 266, 268, 269, 270, 271, 277, 278, 359.1, 359.2, 359.3, 789, 791, 212; 229/123.1, 123.2, 125.35; 215/228, 226; 264/250, 251, 259, 320, 322, 296; 53/487, 488; 413/4, 5, 56

[56] References Cited

U.S. PATENT DOCUMENTS

| | | |
|---|---|---|
| 3,441,167 | 4/1969 | Balocca . |
| 3,804,287 | 4/1974 | Balocca et al. . |
| 4,880,137 | 11/1989 | Wells . |
| 5,059,360 | 10/1991 | Sato . |

*Primary Examiner*—Nathan J. Newhouse
*Attorney, Agent, or Firm*—Burns, Doane, Swecker & Mathis, L.L.P.

[57] ABSTRACT

A lid (1) made of a thermoplastic material for covering an open upper end (42) of a container (40). The lid (1) comprising a lid body (10) with an opening (11) for dispensing and a pull cap (20) having a cap portion (21) to reclose the opening (11) and a pull tab portion (22) integrally formed with the cap portion(21). The opening (11) is covered by a gas-barrier film (23) sealed to a lower surface of the lid body (10). The cap portion (21) is sealed to the gas-barrier film (23) and a clearance (25) is provided between the opening (11) and the outer periphery (15) of the cap portion (21). A method of manufacturing the lid involves inserting the gas-barrier film into a mold cavity, injecting a thermoplastic resin into the cavity to form the lid body, while still warm the molding is removed. After removal, the molding can be thermally shaped along its periphery to form a flange (12) for mounting to a container.

3 Claims, 3 Drawing Sheets

BEVERAGE CAN LID AND METHOD OF MAKING

FIELD OF THE INVENTION

This invention generally relates lids used on containers that hold beverages and the like. More particularly, the present invention relates to the construction and method of manufacturing such container lids.

BACKGROUND OF THE INVENTION

Beverage containers are known that have an upper end opening that is covered and sealed with a lid. In these types of beverage containers, the container is filled with the beverage after the container interior has been sterilized to provide an aseptic state.

Conventional lids for these types of containers typically take one of several different forms. One type of lid, a so-called peelable seal type (hereinafter referred to as a membrane type lid) which is made of a sheet including a stretched PET (polyethylene terephthalate) film, is laminated on the surface of an aluminum foil, etc. and an easy peel layer is provided on the side which is intended to contact the container. The lid is mounted to cover an open upper end of the container and is fuse-bonded in place by heating.

Another type of lid involves a sheet that is designed to cover the open upper end of the container. The sheet is provided with an opening that serves as a drinking-hole. The lid has a pull tab formed from a small piece of material made of a PET/aluminum foil having an easy peel layer and the lid is adapted to cover the opening in the lid.

Another form of lid is one in which the lid is shaped by draw-forming an aluminum foil.

A still further type of lid is prepared by so-called insert injection molding in which an aluminum foil coated with PE (polyethylene), etc. is previously inserted into a mold, and the lid having the desired opening means in the aluminum foil is molded by injection molding.

Unfortunately, the various lid constructions described above are susceptible of certain disadvantages and drawbacks. For example, in the case of the membrane type lid described above, the seal strength between the lid and the container should be high enough to withstand handling during transportation of the products. On the other hand, the opening strength required to remove the lid from the container should be sufficiently low so as to facilitate opening of the container. Unfortunately, it is quite difficult to balance both of these requirements.

Further, since the opening formed after removal of the lid from the container is rather large, the beverage is apt to spill in certain situations, such as when the beverage in the container is being consumed while walking.

In the case of the above-described lid provided with a pull tab, the aforementioned problems associated with the membrane type lid are not as prevalent. However, since the pull tab is formed of a membrane-type sheet, the lid fails to provide a high quality feeling or appearance, but rather gives a rather "cheap-looking" impression to the lid.

The lid that is formed by draw-forming an aluminum foil is disadvantageous in that it is relatively costly.

The last type of lid described above, although useful from the standpoint of providing gas-barrier properties, is problematic in that the coating of aluminum foil with PE is complicated, and the lid has a tendency to be easily peeled. In addition to the foregoing, most of the above-described conventional lids are removed and separated from the beverage container after the container has been opened so that a disposal problem exists. Even in the case of a lid which is not removed from the container at the time of opening, the current technology is such that the opened container cannot be sealed again with the lid.

SUMMARY OF THE INVENTION

The present invention addresses many of the drawbacks and disadvantages discussed above. The container lid of the present invention is designed to be able to withstand handling during transportation of the products, can be easily opened, has excellent gas-barrier properties, possesses a high grade appearance or feeling, can be used to once again seal the container after the container has been opened, and is well suited for aseptic filling of beverage.

The container lid of the present invention is made of a thermoplastic resin and is shaped to cover the upper open end of a container. The lid includes a lid body provided with an opening for discharging contents from the container, and a pull cap. The pull cap has a cap portion attached to seal the opening in the lid body and a pull tab portion that is coupled to the cap portion, with a clearance being defined between the periphery of the opening and the cap portion. The cap portion has an upper outer periphery that is provided with a projection fitted to the periphery of the opening, and the lower surface of the lid body is covered with a gas-barrier film.

According to another aspect of the invention, the lid for covering an open upper end of a container includes a lid body and a pull cap. The lid body is provided with a through opening through which container contents can be discharged. A gas-barrier film is sealed to the lower surface of the lid body and extends across the opening in the lid body. The pull cap includes a cap portion and a pull tab portion that are coupled to one another. The cap portion is sealed to the gas-barrier film so that the opening in the lid body can be exposed by moving the cap portion relative to the lid body to cause tearing of the gas-barrier film adjacent the periphery of the opening.

Another aspect of the invention concerns a method of manufacturing a container lid. The method involves inserting a gas-barrier film into a cavity of a mold of an injection molding machine, injecting a thermoplastic resin into the cavity to form a molding having substantially the same shape as that of the lid, opening the mold while the molding is warn and taking the molding out of the mold, and then thermally shaping the periphery of the molding.

BRIEF DESCRIPTION OF THE DRAWING FIGURES.

Additional details and features of the present invention will become more apparent from the detailed description set forth below considered in conjunction with the accompanying drawing figures in which like elements are designated by like reference numerals and wherein.

DETAILED DESCRIPTION OF THE INVENTION

Figure 1:
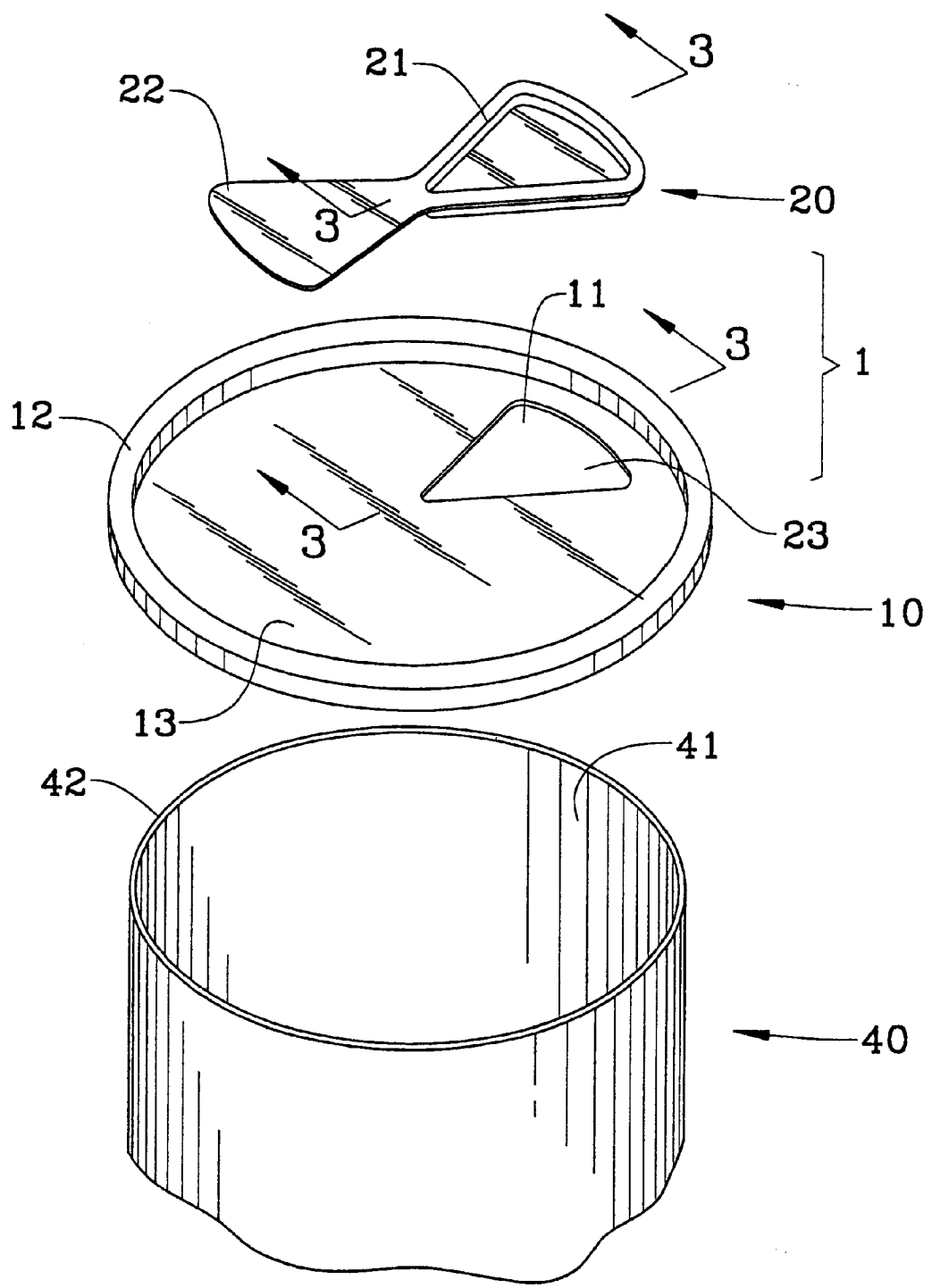
FIG. 1 is an exploded, perspective view showing a container lid according to an embodiment of the present invention for attachment to an open upper end of a beverage container.

With reference initially to FIG. 1, a container 40 has an upper opening 41 that is adapted to be covered with a lid 1 according to the present invention. The lid 1 includes the combination of a lid body 10 and a pull cap 20. The lid body 10, which in the illustrated embodiment is circular, is provided with a flange 12 that forms the outer peripheral portion of the lid body 10. The flange 12 is adapted to be fitted on the upper end portion 42 of the container 40 so that the lid body 10 extends across the open upper end 41 of the container 40. The lid body 10 also includes an opening 11 that serves as a drinking hole or discharge opening for allowing the contents to be removed from the interior of the container 40.

The pull cap 20 includes a cap portion 21 that is adapted to seal the opening 11 in the lid body 10 and a pull tab portion 22 that is coupled to the cap portion 21. The pull tab portion 22 and the cap portion 21 are integrally and unitarily formed as one piece.

As shown in FIG. 1, the opening 11 in the lid body 10 has a sector shaped or pie shaped configuration. However, it is to be understood that other configurations for the opening 11 are also possible. Of course, the cap portion 21 of the pull cap 20 should be configured to correspond to the shape of the opening 11 in the lid body 10.

Figure 3:
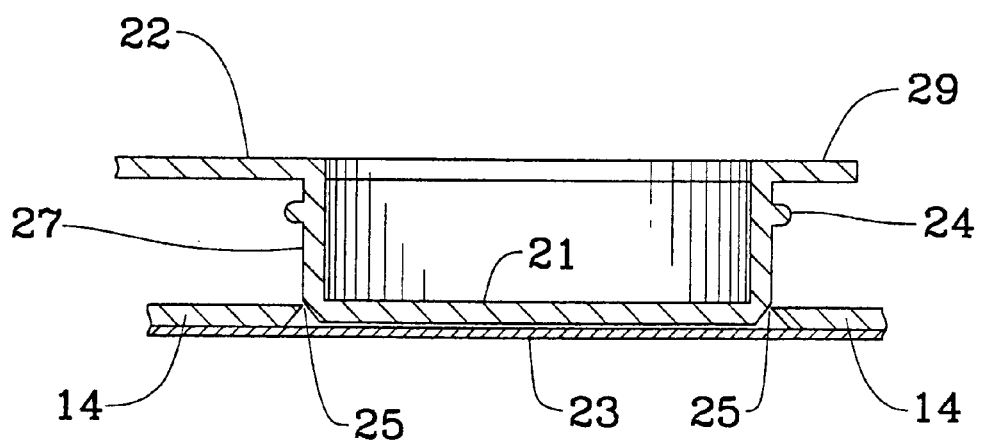
FIG. 3 is an enlarged cross-sectional view of a portion of the container lid attached to a container and taken along the section line 3—3 in FIG. 1.
Figure 4:
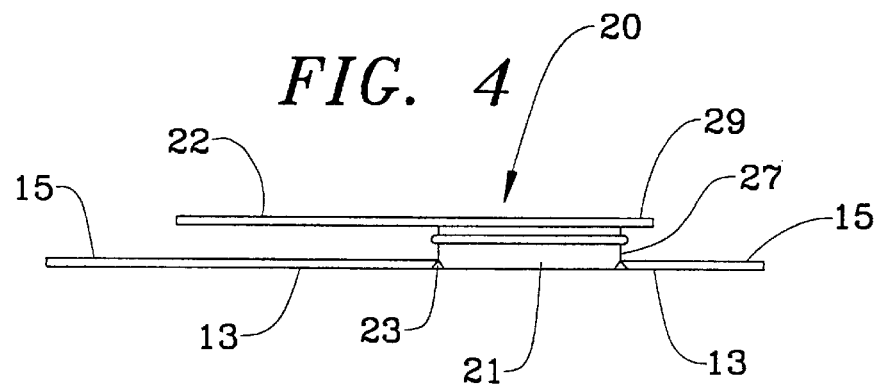
FIG. 4 is a side view of a molding that is obtained after a first stage of the method of the present invention.

As can be seen with reference to FIG. 3, with the pull cap 20 secured in place, a clearance 25 exists in the lid 1 between the peripheral portion 14 of the lid body 10 surrounding the opening 11 and the outer periphery of the cap portion 21. Also, the pull tab portion 22 of the pull cap 20 is preferably spaced from the upper surface of the lid body 10 as seen in FIG. 4.

The peripheral portion or periphery 14 of the opening 11 in the lid body 10 may be any desired cross-sectional shape, but preferably has a sectional shape that spreads or gradually expands in the direction of the container 40 as seen in FIG. 3, so that a triangular shaped or bevelled peripheral edge of the opening having a sharp upper section is provided.

As can be best seen with reference to FIG. 3, the cap portion 21 includes an upstanding neck part 27 and a ledge 29 that overlies the neck part 27. The neck part 27 has an outer peripheral surface, and a protrusion or projection 24 extends radially outwardly from that outer peripheral surface. This protrusion 24 is designed to effect a fitting engagement with the peripheral portion 14 of the opening 11 in a manner that will be described below in more detail.

As also seen with reference to FIG. 3, the lower surface of the lid body 10 is covered with a gas-barrier film 23 having gas-barrier properties, particularly oxygen-barrier properties. The gas-barrier film 23 extends across the opening 11 in the lid body 10 to seal the interior of the container from outside until such time as the lid is opened. In addition, the end face of the neck part 27 of the cap portion 21 is sealed to the gas-barrier film 23. This connection between the cap portion 21 and the gas-barrier film 23 allows the opening 11 in the lid body 10 to be opened by moving the cap portion 21 of the pull cap 20 relative to the lid body 10 so that the gas-barrier film tears or ruptures generally along the periphery of the opening 11.

The lid 1 of the present invention is advantageously designed to allow the container to be sealed once it has been opened. In this regard, one of the container has been opened through removal of the portion of the gas-barrier film 23 spanning the opening 11, the neck part 27 of the cap portion 21 of the pull cap 20 can be inserted into the opening 11 in the lid body 10 with the protrusion portion 24 of the cap portion 21 being in fitting engagement with the peripheral portion 14 of the opening 11. The peripheral portion 14 of the lid body that surrounds the opening 11 is thus sandwiched or otherwise disposed between the protrusion 24 and the overlying rim or ledge 29 on the cap portion 21. It is thus possible to seal the opening 11 in the midst of drinking the beverage or after drinking the beverage.

The lid 1 is preferably formed of a thermoplastic resin. Possible thermoplastic resins include polyolefin, polyethylene terephthalate (PET), polybutylene terephthalate (PBT), polyamide (PA), polystyrene (PS), polyvinyl chloride (PVC), an ethylenevinyl acetate copolymer resin (EVA), an acrylonitrile-butadiene-styrene copolymer resin (ABS), a methacrylic resin (PMA), polycarbonate (PC), ionomer, a cyclic olefin-a-olefin copolymer resin, and others is particularly suitable.

Possible polyolefins that may be used include polyethylene (e.g., low density polyethylene, medium density polyethylene, high density polyethylene, linear low density polyethylene) (PE), polypropylene (e.g., propylene homopolymer, an ethylene-propylene random copolymer, an ethylene-propylene block copolymer), polybutene-1, polyhexene-1 and polymethylpentene-1. These polyolefins may be used individually or in combinations of two or more.

Among the above-mentioned polyolefins, PE, PP or a mixture thereof is particularly desirable.

The gas-barrier film 23 constituting part of the lid 1 should be made of a material having gas-barrier properties, especially oxygen-barrier properties. Possible materials for the gas-barrier film 23 are ethylene-vinyl alcohol copolymer (EVOH), polyvinylidene chloride, and others. EVOH is particularly preferred. As the gas-barrier film 23, a film made of the above material may be used by itself. Alternatively, a laminate of two or more layers with another material such as of the above-mentioned thermoplastic resin may be used.

It is especially advantageous to use, as the gas-barrier film 23, a laminate having a construction in which the layer of the laminate which is to contact the lower surface of the lid body 10 (i.e., the surface that will face inwardly towards the container interior upon attachment of the lid to the container) is a layer formed of the same kind of thermoplastic resin as that of the lid 1, since such a layer can be easily fuse-bonded with the lower surface in fabrication of the lid 1 according to the present invention. Illustrative of such a laminate film is a laminate of PP/EVOH/PP. Optionally, an adhesive layer may be interposed between these resin layers.

The thickness of the gas-barrier film 23 should be at least the minimum thickness required to prevent penetration of gas during the period between the filling of the beverage in the container and the opening of the container. Thus, the appropriate thickness can be determined depending upon the kind of beverage and/or the manner of handling of the container.

The lid according to the present invention having the above construction is applied to the container 40 such that the flange 12 of the lid body 10 is fitted and sealed to the upper portion 42 of the container after the container 40 has been filled with the beverage. Thereafter, the container 40 is generally subjected to sterilization treatment.

To drink or otherwise discharge the beverage from the container 40, all that is necessary is to raise the cap portion 21 of the pull cap 20 upwards, since there is no concern that the gas-barrier film will remain covering the opening 11. That is, as described above, the preferred embodiment involves making the gas barrier film 23, or the layer of the laminate constituting the gas-barrier film 23 that is located on the lid 1 side, of the same kind of material as that of the lid 1. As a result, the bond strength between the cap portion 21 and the gas-barrier film 23 is very good and there is little chance that the cap portion 21 will separate from the gas-barrier film 23 when the cap portion 21 is pulled upwardly. Instead, by virtue of the strong bond strength between the cap portion 21 and the gas-barrier film 23, the gas-barrier film 23 tears along the periphery of the opening 11 in the lid body when the cap portion 21 is pulled upwardly to thereby open or uncover the opening 11.

Additionally, it is possible to open or uncover the opening 11 n the lid body by pushing down on the cap portion 21 of the pull cap 20. This will cause the gas-barrier film 23 to tear along the periphery of the opening 11 and will generate a tensile stress at only the portion of the gas-barrier film 23 along the peripheral portion 14 surrounding the opening 11. Thereafter, the pull tab portion 22 can be pulled up to remove the cap portion 21 with the attached torn portion of the gas-barrier film 23.

As described previously, the opening 11 can be again sealed after the container has been opened by inserting the cap portion 21 of the pull cap 20 into the opening 11 so that the outwardly extending protrusion portion 24 engages the peripheral portion 14. The peripheral portion 14 of the lid body 10 surrounding the opening 11 is then positioned between the protrusion 24 and the overlying ledge 29 on the cap portion 21.

A method for manufacturing the above-described lid 1 according to the present invention preferably involves the following steps. First, a previously prepared gas-barrier film 23 is inserted into the cavity of mold of an injection molding machine. Thermoplastic resin that is to be used as the material for forming the lid 1 is then melted and injected from the injection molding machine into the cavity to form a molded body (partial molding or preform) integrally fuse-bonded with the film and having a side view as shown in FIG. 4.

The mold is cooled and, while the partial molding or preform is still warm, the mold is opened to allow the partial molding or preform to be taken out of the mold. In this case, it is important that the partial molding or preform is taken out of the mold while it is still warm because after the molding has solidified, it is difficult to separate the portion of the lid constituting the pull tab portion 22 of the pull cap 20 from the mold.

Figure 2:
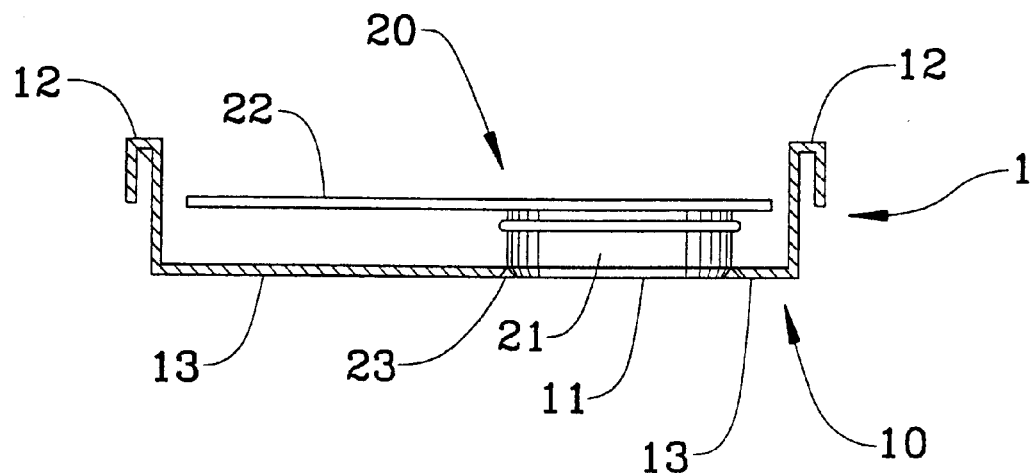
FIG. 2 is a side view of the container lid depicted in FIG. 1.

After the partial molding or preform shown in FIG. 4 is removed from the injection molding machine, it is then subjected to thermal molding to shape the generally planar outer periphery 15 to forms the flange 12 shown in FIG. 2 and thereby result in the lid 1 according to the present invention.

Figure 5:
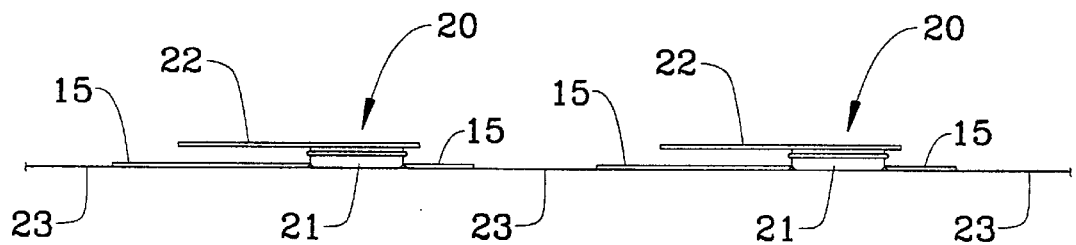
FIG. 5 is a side view of moldings produced by continuously carrying out the first stage of the method of the present invention.

As shown in FIG. 5, the present invention also permits the continuous manufacture of the above-described partial molding or preform by using an elongated gas barrier film 23. By adopting such a continuous molding method, the workability for the manufacture of the lid can be greatly improved.

By virtue of the present invention, a variety of advantages are realized. In one respect, the lid according to the present invention has a strength sufficient to withstand handling during transportation of products and also possesses excellent gas-barrier properties. Also, since the gas-barrier film 23 is provided in the inside layer, the film can be made relatively thin. Thus, only a small force is required to fracture and peel the film 23 for opening the container.

Additionally, when only a portion of the beverage in the container has been consumed or discharged, the opening can be closed with the previously removed pull cap. This makes it rather easy to store the remaining beverage and carry the container without the danger of the beverage spilling from the container.

Also, when the beverage has been completely consumed or discharged from the container and it is necessary to discard the container, the container and the pull cap can be disposed together by inserting and fitting the removed pull cap into the opening.

The lid also has a high quality impression or appearance and permits easy sterilization of the container after filling the beverage.

Further, since the gas-barrier film can be integrally molded simultaneously with the injection molding of the lid main body, the manufacturing cost of the lid is considerably reduced as compared with a method in which a gas-barrier film is fuse-bonded to a molded lid main body.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A method of manufacturing a container lid for attachment to a container, comprising: performing a continuous molding process to produce successive moldings fuse-bonded to an elongated gas-barrier film involving feeding the elongated gas-barrier film into a cavity of a mold of an injection molding machine; injecting thermoplastic resin into said cavity to form the successive moldings that are fuse bonded to the elongated gas-barrier film, each molding comprising a lid body and a pull cap, the lid body being provided with an opening and a lower surface that is sealed to the elongated gas-barrier film, the pull cap having a cap portion and a pull tab portion that are coupled together, said cap portion being disposed relative to the opening in the lid body so that a clearance exists between a periphery of said opening in the lid body and said cap portion, said cap portion having an outer periphery provided with a projection for being fitted within said opening to reclose the opening after the opening has been opened; opening said mold while the molding is warm; and removing the molding from the mold.

2. A method of manufacturing a container lid as recited in claim 1, wherein said molding has a periphery and including the step of thermally shaping the periphery of each molding that is removed from the mold.

3. A method of manufacturing a container lid as recited in claim 1, wherein said step of thermally shaping the periphery of the molding includes forming a flange on the periphery of the molding to permit the lid to be mounted on an open upper end of a container.

* * * * *